United States Patent [19]

Cuda et al.

[11] 4,006,394
[45] Feb. 1, 1977

[54] COARSE AND FINE CONTROL FOR POSITION SERVO

[75] Inventors: John Cuda, Saratoga; Frank J. Sordello, Los Gatos, both of Calif.

[73] Assignee: Information Storage Systems, Inc., Cupertino, Calif.

[22] Filed: Nov. 18, 1974

[21] Appl. No.: 524,766

Related U.S. Application Data

[63] Continuation-in-part of Ser. No. 282,487, Aug. 21, 1972, abandoned.

[52] U.S. Cl. .............................. 318/594; 318/603; 318/596
[51] Int. Cl.[2] ........................................ G05B 11/18
[58] Field of Search .......... 318/576, 592, 594, 596, 318/597, 598, 603, 621

[56] References Cited

UNITED STATES PATENTS

| | | | |
|---|---|---|---|
| 2,947,929 | 8/1960 | Bower | 318/594 |
| 3,013,194 | 12/1961 | Cary | 318/618 |
| 3,105,963 | 10/1963 | Stevens et al. | 318/576 |
| 3,458,785 | 7/1969 | Sordello | 318/594 |
| 3,512,060 | 5/1970 | Floyd | 318/603 |
| 3,523,229 | 8/1970 | Black et al. | 318/603 |
| 3,663,880 | 5/1972 | Gabor | 318/603 |
| 3,721,882 | 3/1973 | Helms | 318/594 |
| 3,736,485 | 5/1973 | Scarrott et al. | 318/603 |
| 3,737,883 | 6/1973 | Sordello et al. | 318/576 |

FOREIGN PATENTS OR APPLICATIONS 47-45763   11/1972   Japan

*Primary Examiner*—Robert K. Schaefer
*Assistant Examiner*—John J. Feldhaus
*Attorney, Agent, or Firm*—Gerald L. Moore

[57] ABSTRACT

A closed loop servo system for positioning a head relative to a magnetic recording element wherein track crossings are normally utilized to generate a feedback signal to the servo for positioning the head and wherein for a precise indication of head positioning between track crossings the velocity of movement of the head is integrated and fed into the servo system to provide a fine position signal.

4 Claims, 6 Drawing Figures

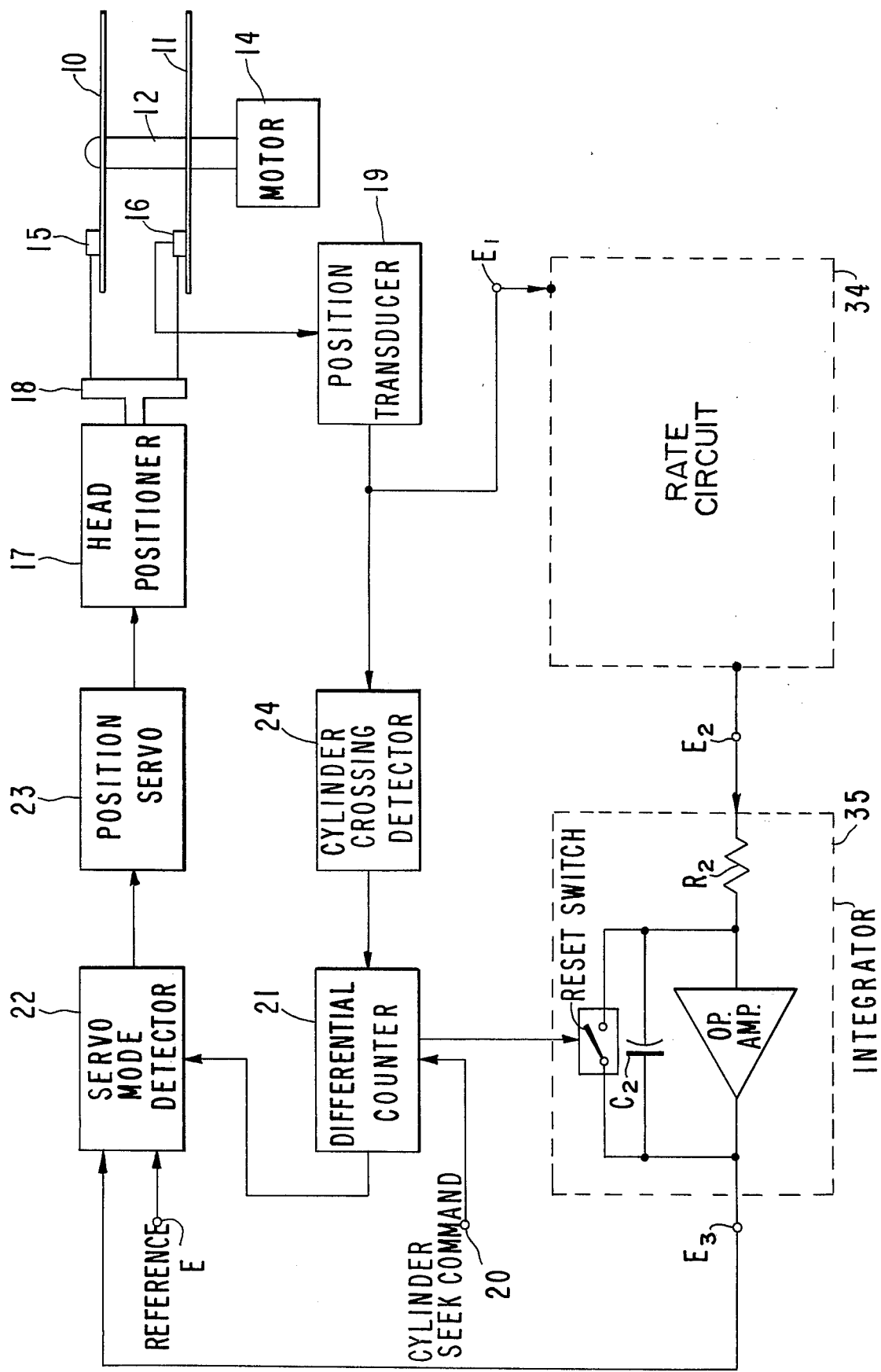

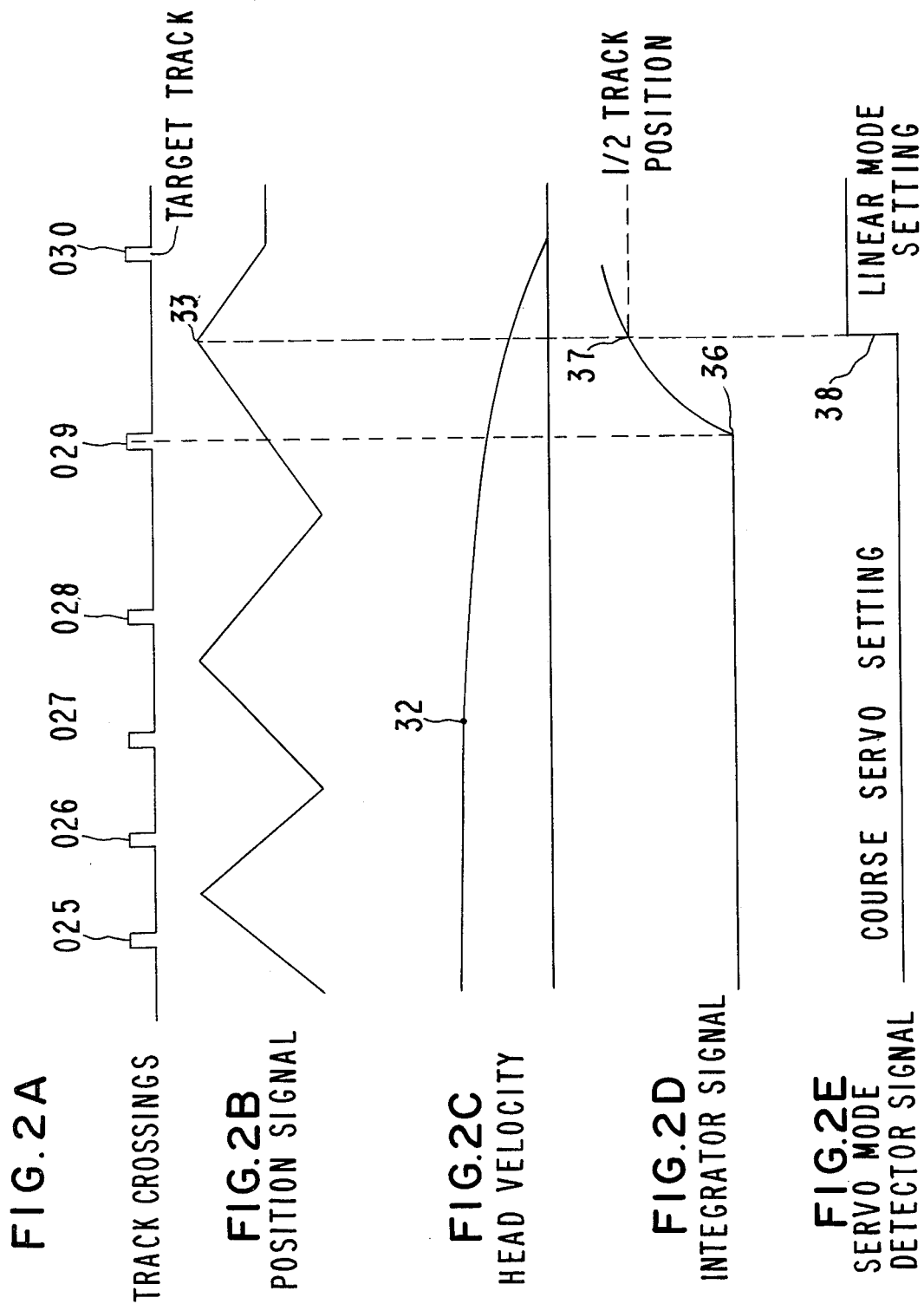

COARSE AND FINE CONTROL FOR POSITION SERVO

BACKGROUND OF THE INVENTION

Field of the Invention

This is a continuation-in-part of Application Ser. No. 282,487, now abandoned, filed Aug. 21, 1972.

This invention relates to a position servo of the type particularly adapted to position read/write heads relative to magnetic recording discs. In magnetic recording devices such as disc drives wherein the information is recorded in concentric tracks on the rotating disc surface the position of the head must be determined with accuracy to permit movement of the head in a random manner to various tracks for reading or writing information.

The precise position of the head must be known at all times to permit stopping the head at the desired track position. If braking of head movement is started too soon or too late, the time necessary for the head to center on the desired track can be a significant portion of the total access time. This time period is commonly referred to as the settlng time. If reading or writing of information is attempted prior to the time the head has settled, i.e. is centered on a desired track position, erroneous recording or readout of information will result.

From the standpoint of knowing the precise position of the head relative to the recording media, it would be advantageous to generate and utilize a signal that varies linearly with head movement. For instance, a signal of zero magnitude could represent head positioning at the outside or the near track and the position signal be increased in magnitude to reach a maximum value with the head positioned at the far or inside track. However with movement of the head an inch or more across the media and for the slope of this signal to be of sufficient value to enable the precise determination of the head position, the magnitude of the signal becomes too great. To use such a system causes the components to operate over such a wide range that the cost and complexity becomes prohibitive.

For those reasons there is used a sawtooth waveform for indicating head position which waveform includes a slope change occurring usually near midpoints between track positions. However, with the use of such a signal, the actual value of the signal does not indicate the head position relative to the tracks, merely the head position relative to the next adjacent track. It therefore has become necessary to provide a servo system that not only detects the position of the head relative to the recording track, but also the head position relative to the next adjacent track so the head can be moved great distances across many tracks for coarse positioning yet be braked at the proper time between track positions for settling directly over the desired track position.

In the past the position signal in the form of the sawtooth waveform was detected by light sensing means by more than one sensor positioned spatially 90° apart with respect to the waveform. Usually a separate grid pattern of light transmitting and light blocking material was mounted to move with the head positioning apparatus through a light beam. By detecting the light passing through the grid as it moved, a position signal was generated. By combining the signals and generating a difference signal the d.c. bias effects were eliminated so that the actual track crossing position could be detected. However now with servo tracks recorded directly on the recording media and being detected by magnetic signal readout heads, more than one head cannot be utilized as before in which optical sensing of grid lines was used. Therefore the combining of signals to eliminate any noise signals, et cetera, is impossible.

It is the ultimate purpose of this invention to not only provide a servo control which determines the crossing of track positions by the head but also detects the position of the head between track positions from the track position signal only.

SUMMARY OF THE INVENTION

A control for regulating a servo system having coarse and linear modes of operation and used for positioning a movable member at selected ones of a plurality of incrementally spaced positions by first setting the servo system in the coarse mode and controlling the servo system by sensing passage of the movable member past the incremental positions and thereafter setting the servo system in the linear mode and controlling the servo system by sensing and integrating the velocity of the movable member thereby to indicate the instantaneous position of the movable member between incremental positions.

BRIEF DESCRIPTION OF THE DRAWINGS

FIG. 1 is a block diagram showing a preferred embodiment of the invention;

FIG. 2 shows various signals detected in this circuit of FIG. 1.

DESCRIPTION OF PREFERRED EMBODIMENT OF THE INVENTION

In FIG. 1 is shown a disc recording system wherein a plurality of memory elements or recording discs 10 and 11 are rotated about a spindle 12 by a motor 14 such that by movement of the read/write heads 15 and 16 towards and away from the axis of rotation of the discs, data can be read or recorded in concentric tracks on the discs. The heads are positioned by a head positioner 17 which actuates the head support assembly 18 thereby moving the heads across the disc surfaces. The head 15 is a standard read/write head used for the purpose of recording or reading data, usually in magnetic form, on the disc surface. Naturally several such read/write heads can be mounted on the head support assembly. The data is recorded in digital form by magnetic orientation of areas of a magnetic material fixed to the disc surface. Such recording is well known in today's technology.

The head 16 in this example is a read only head which is used to detect alignment with prerecorded servo data tracks (not shown) incrementally spaced on the surface of the disc 11. These data tracks correspond with the desired position of data tracks on the disc 10 and any other discs which might be mounted on the spindle 12. The head 16 detects alignment with and the crossing over or passing of each of the prerecorded data tracks and transmits a signal to the position transducer 19 of such occurrence. The track positions are referred to as cylinders since each track position represents a concentric circle on the stacked discs such that a cylinder location is formed.

In movement of the head to a target cylinder or track, a cylinder seek command is transmitted from the computer system (not shown) to the terminal 20 which serves to energize the differential counter 21. The differential counter provides a first signal to the servo mode detector 22 and position servo 23 which sets the servo in the coarse operating mode and causes energization of the head positioner 17 to begin movement of the heads. As each cylinder is crossed, the head 16 detects such occurrence and transmits a signal to the position transducer 19 which, through the cylinder crossing detector 24, generates a signal which is fed to the differential counter. The differential counter 21 thereafter subtracts one unit from the number of track crossings necessary to reach the target cylinder. At a predetermined time before the differential counter reaches a zero count deacceleration of the head is initiated for stopping the head at the desired cylinder location. Such operation of a head positioning system is well known in the computer industry.

However for rapid deacceleration of the head to stop at the required track position with a minimum of settling time, it is necessary to detect the head location between cylinder locations to permit the changing of the position servo from a coarse operating mode to a second operating mode comprising a linear or fine mode thereby preventing overrun and permitting the "locking in" on the target cylinder location. Such dual mode servo systems are well known in the art with one being described in the U.S. Pat. No. 3,458,785 which issued on July 29, 1969 entitled Fine and Coarse Motor Positioning Control for a Magnetic Disc Memory.

However, because only actual track or cylinder locations are detected by the servo head 16, detection of the head position between cylinder locations is not economically possible in the position detecting systems utilized today. As can be seen in FIG. 2A, as each track location 025, 026, 027, 028 and 029 is passed in approaching the target track 030, a position signal is generated comprising alternating positive and negative slopes, which signal appears at the output of the position transducer. At some cylinder location, for instance in the illustration at track location 027, or when the differential counter reaches a setting of 3, deacceleration of the head is initiated as indicated by the change in slope of the head velocity curve in FIG. 2C at point 32. Thereafter the servo is designed to be switched to a linear mode of operation at the half-track position following track 029 to enable the servo to "lock on" to the next target track 030.

With the position signal appearing as shown in FIG. 2B it is necessary to sense the half-track position between track crossings 029 and 030. One method of doing so might be to use a signal level detector for sensing the point 33 of the signal. Thus the approach would be to set the level detector to sense the signal magnitude near that of point 33. However, the question remains what signal level to set the level detector.

Because of the possible presence of extraneous d.c. bias signals on the position signal, the signal either might greatly exceed that value, or never reach it. If it exceeds that value the servo will be switched too soon and will receive positive feedback drive due to the incorrect slope in the region between track 029 and point 32 which at best will cause a great deal of overshoot when the servo tries to position to track 030 thereby increasing the settling time. If the signal doesn't reach the limit value, the servo system will never be switched to the linear mode.

Efforts to remove the d.c. bias have included the inclusion of a capacitor in the signal circuit. However, capacitive coupled circuits have a transient or settling time also and a single pulse fed to a capacitor will result not in the elimination of the d.c. bias, but instead in a transmission of substantially the same signal received. A capacitor d.c. decoupling circuit has a time constant during which it will conduct less and less of the d.c. bias until finally a steady state condition is reached whereby the bias signal is eliminated if a repetitive pulsing signal is fed through it. Obviously it is not satisfactory in the present control to require several track crossings before any d.c. bias is removed.

Accordingly, the present invention is provided wherein the coarse position signal is utilized to trigger the activation of a circuit which detects the velocity of the head by use of a rate circuit which differentiates the position signal to obtain a signal responsive to velocity. Thereafter the true velocity signal is integrated to render a second or fine position signal, which signal indicates when the head reaches a predetermined location and serves to switch the servo mode from coarse to linear operating mode thereby permitting the "locking in" of the head onto the target cylinder location.

To accomplish the invention, the differential counter 21 continues to supply to the servo mode detector a signal indicative of the number of cylinders yet to be crossed. When this number reaches one indicating the head is crossing the next adjacent cylinder prior to the desired cylinder, or in the illustration when the head passes track 029, the circuit including a rate circuit 34 and an integrator 35 is enabled responsive to that condition by the closing of the reset switch 35S by a signal supplied from the differential counter to thereafter provide a signal to the servo mode detector 22.

The rate circuit is a differentiator of any of several well known designs which in differentiating the signal, naturally removes the d.c. bias effect by supplying to the integrator a signal which is the time derivative of the position signal, i.e. a velocity signal. Now with this velocity signal indicative of the actual velocity of the head, the integral thereof is the actual incremental position of the head. By level detecting this incremental position signal, the total increment of head movement from track 029, the location at which the integrator 35 started, to point 37, the midtrack position or any other position can be accurately detected. As shown in FIG. 2D, the integrator signal or that signal at point E3 remains zero until that circuit is energized. At point 36 the integrator signal indicative of the incremental head motion at track 029 is fed to the servo mode detector. The servo mode detector detects the level of this integrator signal and at point 37 a signal level corresponding to the half-track position is sensed at which time the servo mode detector switches from a coarse servo mode setting to a linear mode setting as indicated at point 38 in FIG. 2E showing the servo mode detector signal change to adjust the position servo to the linear mode. Thereafter the position servo is able to lock on to the next encountered track position (or track 030) as detected by the servo head 16 to hold the read/write head 15 at the desired cylinder location.

The level of the integrator signal is detected by comparing it with a reference signal supplied at terminal E (FIG. 1). At the time the integrator signal exceeds the reference signal at point 37, the servo mode detector generates a step signal 38 switching the servo from a coarse mode during which track crossings are counted to a linear mode during which the servo is set to respond only to the position signal for detecting a track crossing position.

The use of the integrator 35 involves more than the mere restoration of the velocity signal differentiated by the rate circuit 34. First, by differentiating the velocity signal, any constant included therein such as a d.c. bias is eliminated during the differentiating process as well known to those skilled in the art. Integration will then supply a signal to detector 22 free of any d.c component and without any delay ordinarily inserted by the capacitative reactance of filter circuits. Second, the functional period of the integrator 35 is limited to approach of the transducer head 16 to the selected position as depicted by the curve extending from point 36 to point 37 in FIG. 2D.

We claim:

1. In combination with a servo system for incrementally positioning a movable member, said servo system being rendered operative under coarse and fine operational modes in response to position signals received from a single position sensor, mode control means for switching the servo system from the coarse to the fine operational mode during deceleration of the movable member toward a selected one of a plurality of incremental positions with minimal settling time, including differentiating means connected to the position sensor for converting said position signals into a velocity signal during movement of the movable member past each of said incremental positions, integrating means connected to said differentiating means for integrating said velocity signal in response to approach of the movable member to said selected one of the positions to generate a mode control signal and detector means connected to the integrating means for detecting a predetermined signal level of said integrated velocity signal to switch the servo system to the fine operational mode, whereby bias effects imposed on the position signals do not influence switching of the servo system to the fine operational mode.

2. The combination of claim 1 wherein said differentiating means comprises a rate circuit removing d.c. bias from the velocity signal.

3. The combination of claim 2 wherein said movable member is a transducer head operatively positioned relative to a magnetic memory component provided with at least two data tracks, said position sensor including only one reading head displaceable with the transducer head relative to one of said data tracks.

4. The combination of claim 1 wherein said movable member is a transducer head operatively positioned relative to a magnetic memory component provided with at least two data tracks, said position sensor including only one reading head displaceable with the transducer head relative to one of said data tracks.

* * * * *